(12) United States Patent
Kim et al.

(10) Patent No.: US 8,811,267 B2
(45) Date of Patent: Aug. 19, 2014

(54) COMMUNICATION SYSTEM FOR SUPPORTING PRIMARY USER AND SECONDARY USER

(75) Inventors: Jun Mo Kim, Seoul (KR); Chang Soon Park, Chungju-si (KR); Duck Dong Hwang, Yongin-si (KR); Sung Jin Kim, Suwon-si (KR); Pramod Viswanath, Urbana, IL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 12/190,667

(22) Filed: Aug. 13, 2008

(65) Prior Publication Data
US 2010/0041406 A1    Feb. 18, 2010

(51) Int. Cl.
H04B 7/204    (2006.01)

(52) U.S. Cl.
USPC ........... 370/319; 370/315; 370/343; 370/334; 370/209; 455/446; 455/561

(58) Field of Classification Search
USPC .......... 370/329, 338, 343, 208; 455/446, 561, 455/550.1, 450, 509
See application file for complete search history.

(56) References Cited

U.S. PATENT DOCUMENTS

| | | | |
|---|---|---|---|
| 5,923,701 A * | 7/1999 | Nakamura | 375/142 |
| 6,662,024 B2 | 12/2003 | Walton et al. | |
| 6,862,271 B2 | 3/2005 | Medvedev et al. | |
| 7,020,110 B2 | 3/2006 | Walton et al. | |
| 7,920,825 B2 * | 4/2011 | Popovski et al. | 455/11.1 |
| 8,228,835 B2 * | 7/2012 | Yuan et al. | 370/315 |
| 2003/0002490 A1 * | 1/2003 | Wong et al. | 370/355 |
| 2004/0132405 A1 * | 7/2004 | Kitazawa et al. | 455/13.4 |
| 2004/0166869 A1 * | 8/2004 | Laroia et al. | 455/450 |
| 2004/0229625 A1 * | 11/2004 | Laroia et al. | 455/450 |
| 2005/0020237 A1 * | 1/2005 | Alexiou et al. | 455/403 |
| 2005/0047517 A1 | 3/2005 | Georgios et al. | |
| 2005/0226268 A1 * | 10/2005 | Wang et al. | 370/465 |
| 2006/0067269 A1 * | 3/2006 | Jugl et al. | 370/329 |
| 2006/0203713 A1 * | 9/2006 | Laroia et al. | 370/209 |
| 2006/0209754 A1 * | 9/2006 | Ji et al. | 370/329 |

(Continued)

FOREIGN PATENT DOCUMENTS

| | | |
|---|---|---|
| CN | 1778121 A | 5/2006 |
| JP | 2003-110496 A | 4/2003 |

(Continued)

OTHER PUBLICATIONS

Japanese Office Action issued on Apr. 23, 2013 in counterpart Japanese Application No. 2011-522888 (3 pages, in Japanese).

(Continued)

*Primary Examiner* — Rasheed Gidado
(74) *Attorney, Agent, or Firm* — NSIP Law (57) ABSTRACT

A communication system for supporting a primary user and a secondary user is provided. A base station of a communication system, includes a scheduler to group at least one primary user and at least one secondary user corresponding to each of the at least one primary user according to characteristics of services desired by users, a superposition coding unit to perform superposition coding for primary data associated with the at least one primary user and secondary data associated with the at least one secondary user to generate a transmission data stream, and a beamformer to perform beamforming for the transmission data stream.

27 Claims, 8 Drawing Sheets

(56) References Cited

U.S. PATENT DOCUMENTS

| | | |
|---|---|---|
| 2007/0067269 A1* | 3/2007 | Rudge et al. .................. 707/3 |
| 2007/0230406 A1* | 10/2007 | Kim et al. .................. 370/335 |
| 2007/0270170 A1* | 11/2007 | Yoon et al. .................. 455/509 |
| 2007/0286238 A1* | 12/2007 | Wang et al. .................. 370/478 |

FOREIGN PATENT DOCUMENTS

| | | |
|---|---|---|
| JP | 2007-110317 | 4/2007 |
| KR | 10-2003-0027125 | 4/2003 |
| KR | 10-2004-0073551 | 8/2004 |
| KR | 10-2005-0046303 | 5/2005 |
| KR | 10-2005-0081040 | 8/2005 |
| KR | 10-2005-0082153 | 8/2005 |
| KR | 10-2006-0077800 | 7/2006 |
| WO | WO 2006/096680 A1 | 9/2006 |

OTHER PUBLICATIONS

Chinese Office Action issued May 6, 2013 in counterpart Chinese Application No. 200880131547.8 (10 pages, in Chinese).

* cited by examiner

COMMUNICATION SYSTEM FOR SUPPORTING PRIMARY USER AND SECONDARY USER

TECHNICAL FIELD

The following description relates to a communication system, and more particularly, to a downlink communication being performed between a base station and terminals in a multiple-input multiple-output (MIMO) communication system.

BACKGROUND

A number of researches are being conducted to provide various types of multimedia services, for example, voice services, and to support high quality and high speed of data transmission in a wireless communication environment. Technologies associated with a multiple-input multiple-output (MIMO) communication system using multiple channels, are also in rapid development to provide various types of multimedia services and to support high quality and high speed of data transmission.

In a MIMO communication system, a base station may support a plurality of users, that is, terminals, using a spatial division multiplexing access (SDMA) scheme. The SDMA scheme may transmit at least one data stream to multiple users via a plurality of antennas. The SDMA scheme may utilize wireless resources more effectively, thereby increasing a data rate of the MIMO communication system. The MIMO communication system supporting the plurality of users may adopt a single beam to support a single user. Accordingly, where the base station includes M transmit antennas, the base station may simultaneously support a maximum of M number of users.

Increasingly, users desire to receive various types of services, and services with various characteristics may be provided. For example, a user 1 may desire a service supporting a large data size with a non-strict delay tolerance. Conversely, a user 2 may desire a service supporting a small data size but with a strict delay tolerance. Here, the strict delay tolerance may indicate that the delay should be short.

Generally, a conventional MIMO communication system does not take into consideration the characteristics of services when scheduling users. Accordingly, in the conventional MIMO communication system, it may allocate a single beam to only one user, requiring a service with small data size, for more than a required period of time. Consequently, wireless resources may not be utilized effectively. Accordingly, there is a need for a method of scheduling users based on characteristics of services desired by the users.

SUMMARY

In one general aspect, there is provided a base station and a signal transmission method that allocates a single beam to at least one primary user and at least one secondary user based on characteristics of services desired by users.

In another general aspect, there is provided a base station and a signal transmission method that determines a primary user and a secondary user based on characteristics of services desired by users.

In still another general aspect, there is provided a base station and a signal transmission method that performs superposition coding to generate a transmission data stream enabling simultaneous support of a primary user and a secondary user.

In yet another general aspect, there is provided a terminal and a signal reception method that identifies primary data and secondary data from a transmission data stream.

In yet another general aspect, there is provided a base station comprising a scheduler to group at least one primary user and at least one secondary user corresponding to each of the at least one primary user according to characteristics of services desired by users, a superposition coding unit to perform superposition coding for primary data associated with the at least one primary user and secondary data associated with the at least one secondary user to generate a transmission data stream, and a beamformer to perform beamforming for the transmission data stream.

The scheduler may group the at least one primary user and the at least one secondary user based on at least one of a data size, a data rate, and a delay tolerance of the services required by the users.

The scheduler may group the at least one primary user and the at least one secondary user based on channel state information of channels that are formed between the users and the base station.

The scheduler may calculate achievable sum data rates based on channel state information of channels formed between the users and the base station, and select the at least one primary user based on the calculated sum data rates.

The scheduler may select the at least one primary user based on orthogonality of channels formed between the users and the base station using channel state information of the channels.

The superposition coding unit may perform superposition coding so as to identify the primary data and the secondary data from the transmission data stream.

The superposition coding unit may modify the primary data according to a pulse position modulation scheme, based on the secondary data, to generate the transmission data stream.

The superposition coding unit may modify the primary data in at least one frequency band among a plurality of frequency bands allocated for the primary data based on the secondary data, to generate the transmission data stream.

The superposition coding unit may select at least one frequency band from a plurality of frequency bands allocated for the primary data and modifies the primary data to include a predetermined signal in the selected at least one frequency band, so as to identify the primary data and the secondary data from the transmission data stream.

The predetermined signal may be a pulse signal.

The superposition coding unit may modify the primary data in at least one time slot among a plurality of time slots allocated for the primary data based on the secondary data, to generate the transmission data stream.

The superposition coding unit may select at least one time slot from a plurality of time slots allocated for the primary data and modifies the primary data to include a predetermined signal in the selected at least one time slot, so as to identify the primary data and the secondary data from the transmission data stream.

The size of the primary data may be greater than the size of the secondary data, or a delay tolerance of a service required by the secondary user may be strictly limited in comparison to a delay tolerance of a service required by the primary user.

The beamformer may perform beamforming for the transmission data stream to generate a single beam for the at least one primary user and the at least one secondary user.

The scheduler may divide a frequency band to schedule at least two primary users with respect to the single beam.

The primary data may be encoded according to an additive white Gaussian noise (AWGN) channel code and the primary data may be modulated according to a predetermined modulation scheme.

In yet another general aspect, there is provided a terminal for receiving a transmission signal, from a base station, which is generated by beamforming a transmission data stream in which primary data associated with a primary user and secondary data associated with at least one secondary user corresponding to the primary user are provided, the terminal comprising a signal receiver to receive the transmission signal, an identifier to identify one of the primary data and the secondary data from the transmission signal according to a characteristic of a predetermined coding scheme, and a decoder to decode the one of the primary data and the secondary data.

The transmission data stream may be a data stream in which the primary data and the secondary data are superposition coded, and having the primary data in which at least one frequency band or at least one time slot, among a plurality of frequency bands or a plurality of time slots allocated for the primary data, is modified based on the secondary data, and the identifier may identify the one of the primary data and the secondary data from the transmission data stream according to a position of the at least one frequency band or a position of the at least one time slot.

The transmission data stream may be a data stream generated according to a pulse position modulation scheme, and the identifier may identify the primary data and the secondary data from the transmission data stream based on a position of at least one pulse included in the transmission data stream.

The position of the at least one pulse included in the transmission data stream may be associated with at least one time slot or at least one frequency band where the at least one pulse exists.

The transmission data stream may be a data stream having the primary data and the secondary data associated with the primary user and the at least one secondary user that are grouped based on characteristic of services desired by users and/or channel state information of channels formed between the users and the base station.

The characteristics of the services may be associated with at least one of a data size, a data rate, and a delay tolerance of the services required by the users.

In yet another general aspect, there is provided a signal transmission method comprising grouping at least one primary user and at least one secondary user corresponding to each of the at least one primary user according to characteristics of services desired by users, performing superposition coding for primary data associated with the at least one primary user and secondary data associated with the at least one secondary user to generate a transmission data stream, and performing beamforming for the transmission data stream.

The grouping may comprise grouping the at least one primary user and the at least one secondary user based on at least one of a data size, a data rate, and a delay tolerance of the services required by the users.

In yet another general aspect, there is provided a signal reception method comprising receiving, from a base station, a transmission signal that is generated by beamforming a transmission data stream, in which primary data associated with a primary user and secondary data associated with at least one secondary user corresponding to the primary user are provided, identifying one of the primary data and the secondary data from the transmission data stream according to a characteristic of a predetermined coding scheme, and decoding the one of the primary data and the secondary data.

In yet another general aspect, there is provided a terminal for receiving a transmission signal corresponding to a transmission data stream having primary data for a primary user and secondary data for a secondary user corresponding to the primary user, the primary and secondary users grouped among users based on characteristics of services desired by the users and/or channel state information of the users, the terminal comprising a signal receiver to receive the transmission signal, an identifier to identify one of the primary data and the secondary data from the transmission signal, and a decoder to decode the one of the primary data and the secondary data.

Transmission signal may correspond to one of the transmission data stream having the primary data and the secondary data in which the primary user is selected among the users to achieve a predetermined sum data rate, and the secondary user is selected among non-primary users of the users based on the channel state information, the transmission data stream having the primary data and the secondary data in which one of the primary user and the secondary user is selected based on the channel state information and the other is selected based on at least one of a data size, a data rate, and a delay tolerance of the services required by the users, and the transmission data stream having the primary data and the secondary data in which the primary user and the secondary user are selected based on at least one of a data size, a data rate, and a delay tolerance of the services required by the users.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions are omitted to increase clarity and conciseness.

Figure 1:
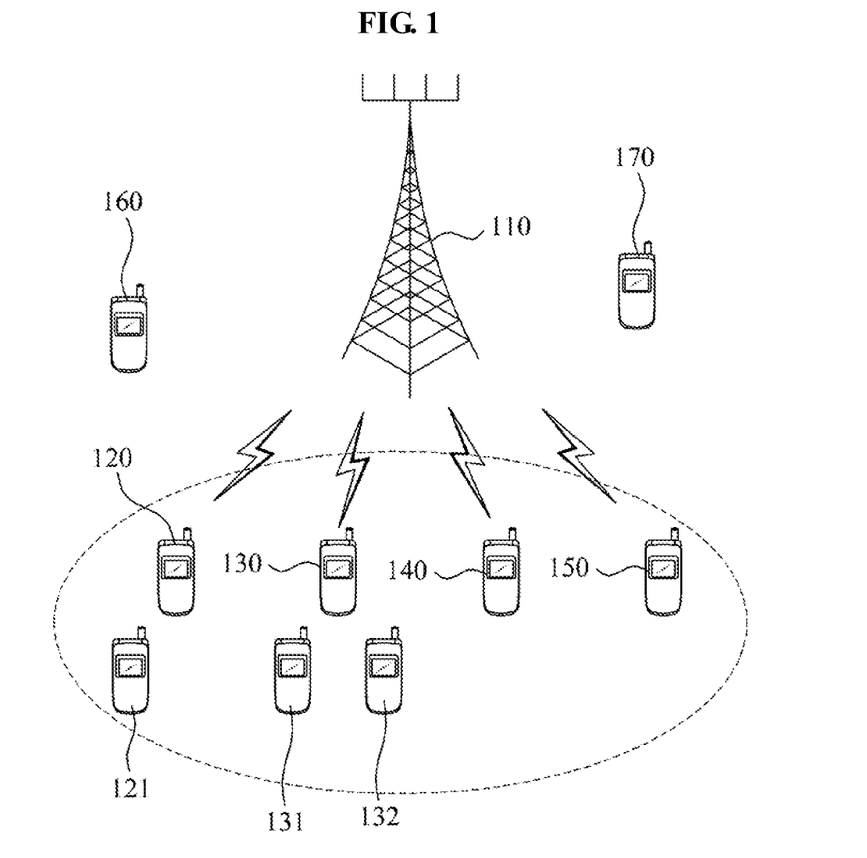
FIG. 1 is a diagram illustrating a multiple-input multiple-output (MIMO) communication system according to an exemplary embodiment.

FIG. 1 illustrates a multiple-input multiple-output (MIMO) communication system according to an exemplary embodiment.

As illustrated in FIG. 1, the MIMO communication system comprises a base station 110 and a plurality of users 120, 121, 130, 131, 132, 140, 150, 160, and 170. Wireless channels are formed between the base station 110 and the plurality of users 120, 121, 130, 131, 132, 140, 150, 160, and 170. The base station 110 may transmit downlink data to the plurality of users 120, 121, 130, 131, 132, 140, 150, 160, and 170 via the formed wireless channels, respectively.

Hereinafter, a downlink operation of the MIMO communication system will be described. The base station 110 transmits a well-known signal such as a pilot signal to the plurality of users 120, 121, 130, 131, 132, 140, 150, 160, and 170. Each of the users 120, 121, 130, 131, 132, 140, 150, 160, and 170 estimates a channel based on the pilot signal to feed back channel state information (CSI) of the estimated channel to the base station 110. According to an aspect, the CSI may include channel direction information (CDI) and/or channel quality information (CQI).

The base station 110 may select K users from the plurality of users 120, 121, 130, 131, 132, 140, 150, 160, and 170 based on the CSI. In particular, the base station 110 may select K users to maximize a sum of data transmission rates, that is, a sum data rate. The K may be less than or equal to M being a number of transmit antennas of the base station 110.

Also, the base station 110 may perform beamforming for data streams associated with the selected K users, using beamforming vectors. The beamforming vectors corresponding to the K users may be obtained from a predetermined codebook based on the CSI. The base station 110 may extract the beamforming vectors from the codebook to maximize the sum data rate. Also, the beamforming vectors corresponding to the K users may be independently calculated based on the CSI. For example, the base station 110 may extract the beamforming vectors from the codebook, or may calculate the beamforming vectors to minimize interference occurring between the users according to a zero-forcing (ZF) algorithm and the like.

In FIG. 1, it is assumed that four transmit antennas are installed in the base station 110 and four users 120, 130, 140, and 150 are selected so as to maximize the sum data rate based on, for example, the CQI. Also, it is assumed that other users 121, 131, and 132, excluding the four users 120, 130, 140, and 150, require a service supporting a small data size with a strict delay tolerance.

For example, the users 121, 131, and 132 may require a packet with a small data size with a strict delay tolerance such as or for a gaming service, a Voice over Internet Protocol (VoIP) service, Transmission Control Protocol/Internet Protocol (TCP/IP) acknowledgements, various control signals, and the like. The services may need to be provided for the users 121, 131, and 132 with little latency.

Generally, since the users 121, 131, and 132 are not selected by the base station 110, the base station 110 may not provide the services desired by the users 121, 131, and 132. For example, the base station 110 may perform beamforming for data streams only for the selected four users 120, 130, 140, and 150 to thereby generate a transmission signal, and thus the users 121, 131, and 132 may not receive data associated with the users 121, 131, and 132.

According to an aspect, the base station 110 may support the selected four primary users 120, 130, 140, and 150, as well as the users 121, 131, and 132 not selected as the primary users. In particular, the base station 110 may perform superposition coding for data associated with the selected primary users 120, 130, 140, and 150 and data associated with the users 121, 131, and 132 not selected as the primary users, to thereby generate a transmission signal. The four selected users 120, 130, 140, and 150, and the non-selected users 121, 131, and 132 may identify the data associated with the primary users 120, 130, 140, and 150, and the data associated with the non-selected users 121, 131, and 132 based on the transmission signal, respectively.

Figure 2:
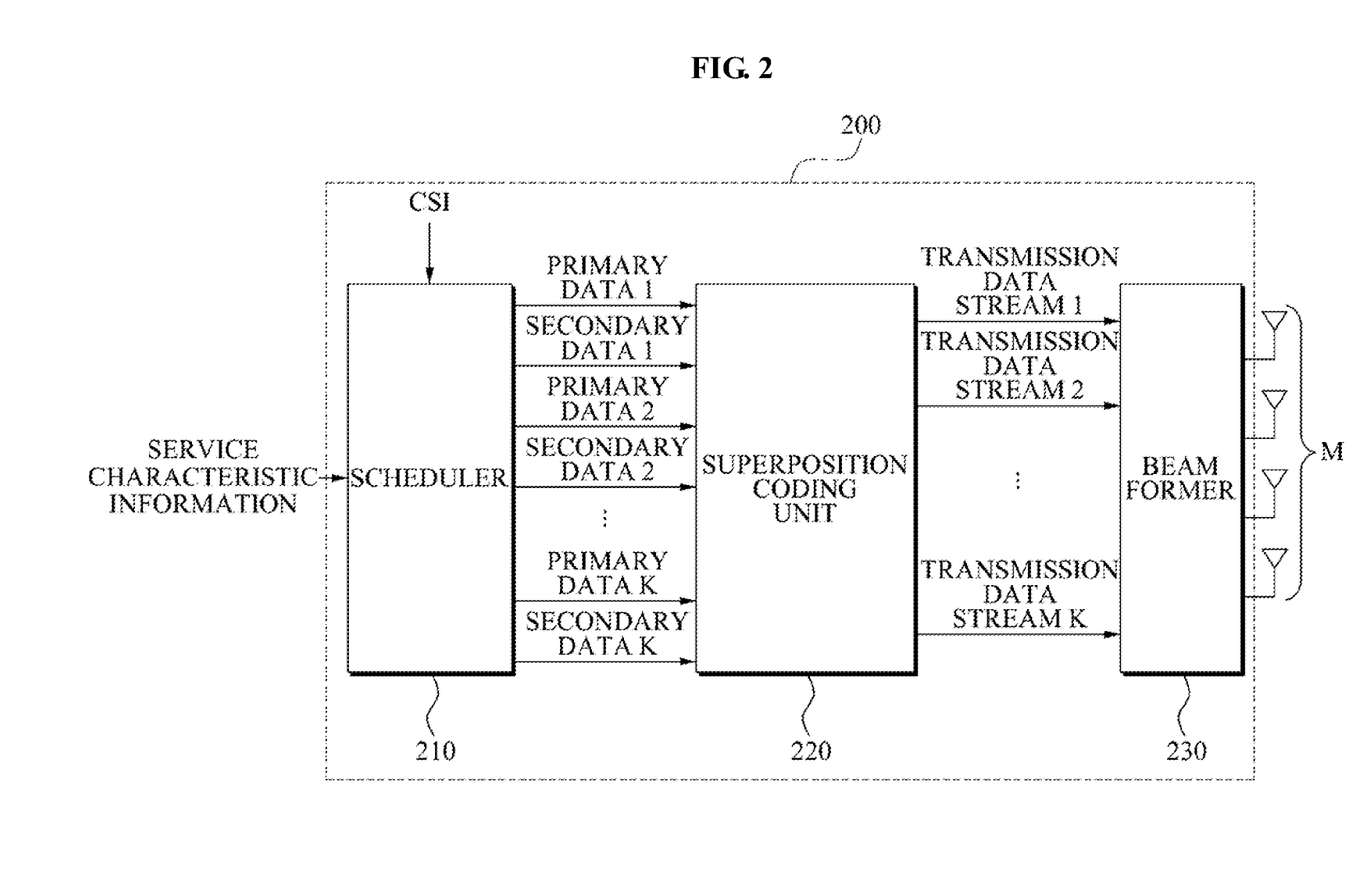
FIG. 2 is a block diagram illustrating a base station according to an exemplary embodiment.

FIG. 2 illustrates a base station 200 according to an exemplary embodiment.

As illustrated in FIG. 2, the base station 200 comprises a scheduler 210, a superposition coding unit 220, and a beamformer 230.

The scheduler 210 groups at least one primary user and at least one secondary user corresponding to each of the at least one primary user according to characteristics of services desired by users. For example, where the base station 200 includes four transmit antennas, the scheduler 210 may select four primary users and select at least one secondary users corresponding to each of the four primary users.

The characteristics of services desired by the users may be associated with at least one of a data size of the services required by the users, a required data rate, and a delay tolerance. For example, a user requiring a small data size, low data rate, and a strict delay tolerance may be selected as a secondary user. A user requiring a large data size, high data rate, and a non-strict delay tolerance may be selected as a primary user.

According to an aspect, the scheduler 210 may group the at least one primary user and the at least one secondary user based on CSI of channels that are formed between the users and the base station. For example, referring again to FIG. 1, where the base station 110 selects the user 120 as the primary user, the base station 110 may retrieve the user 121 with a channel direction similar or closest to a channel direction of the user 120 based on the CSI. The base station 110 may determine the user 121 as a secondary user corresponding to the primary user 120. Similarly, where the base station 110 selects the user 130 as the primary user, the base station 110 may determine the users 131 and 132 as secondary users corresponding to the user 130.

According to an aspect, the scheduler 210 may calculate a total sum of achievable data transmission rates, that is, a sum data rate based on the CSI and select at least one primary user so that the calculated sum data rate may be maximized. In particular, the scheduler 210 may select at least one primary user according to a greedy user selection (GUS) algorithm. Also, the scheduler 210 may select primary users according to a semi-orthogonal user selection (SUS) algorithm, and the like, so that channel directions of primary users may be nearly orthogonal to each other.

Figure 3:
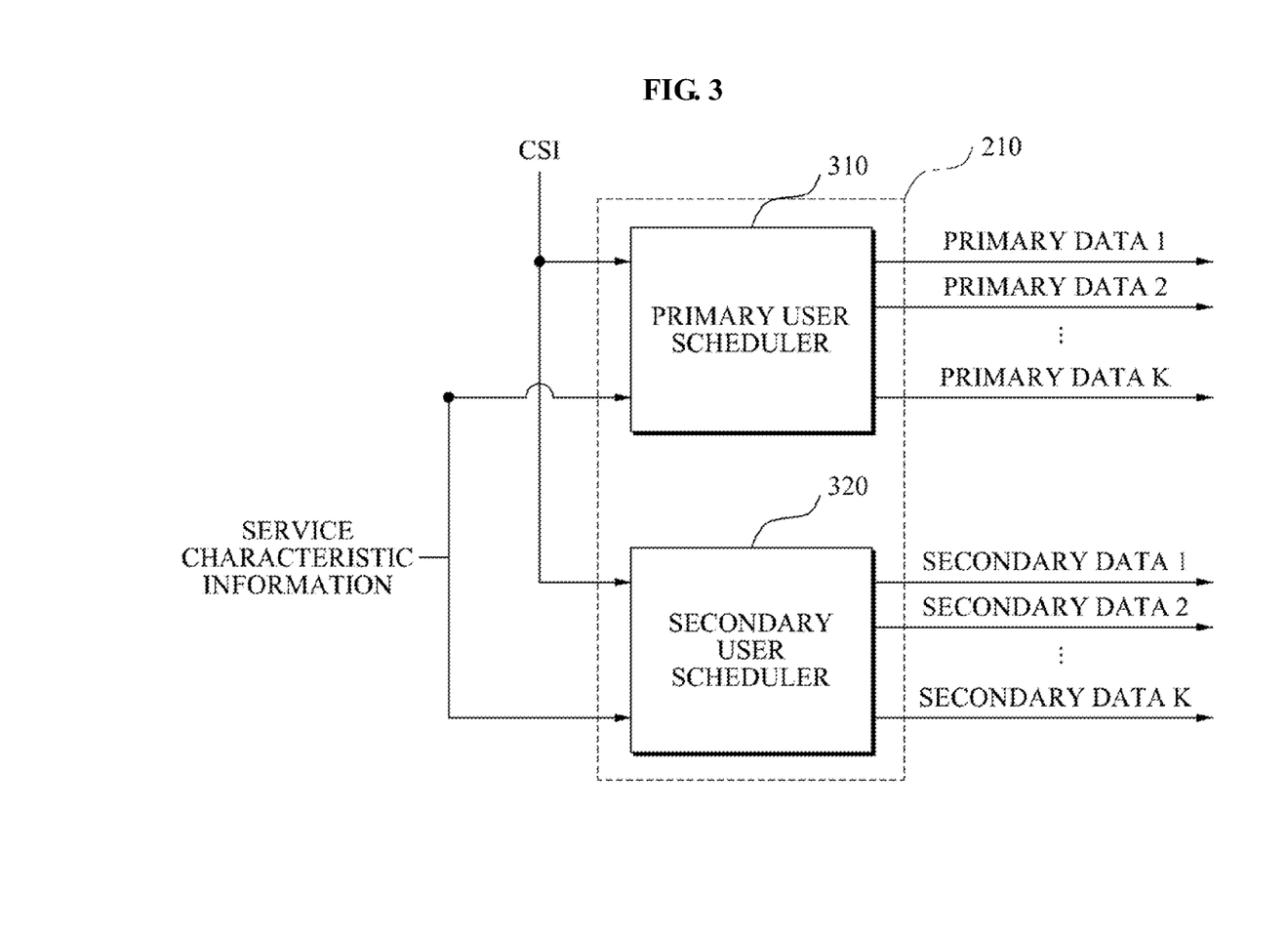
FIG. 3 is a block diagram illustrating a scheduler shown in FIG. 2 according to an exemplary embodiment.

FIG. 3 is illustrates an exemplary configuration of the scheduler 210 shown in FIG. 2.

As illustrated in FIG. 3, the scheduler 210 comprises a primary user scheduler 310 and a secondary user scheduler 320.

The primary user scheduler 310 selects, as primary users, K users from a plurality of users. The primary user scheduler 310 may select the primary users to maximize the sum data rate. Also, the primary user scheduler 310 may determine the primary users based on service characteristic information associated with services desired by the users.

For example, users requiring a service with a large data size may be determined as the primary users. In FIG. 3, data associated with each of the K primary users is indicated as primary data 1, primary data 2, . . . , primary data K. The primary data may be one encoded according to an additive white Gaussian noise (AWGN) channel code such as a convolutional code, a turbo code, a low-density parity check (LDPC) code, and the like, and may be modulated according to a predetermined modulation scheme such as a quadrature amplitude modulation (QAM) scheme, a quadrature phase shift keying (QPSK) scheme, and the like.

The secondary user scheduler 320 selects at least one secondary user with respect to each of the selected primary users based on CSI and/or service characteristic information. For example, users requiring services with a small data size and required data rate but a strict delay tolerance may be selected as the secondary users. The selected secondary users may be grouped together with the primary users according to their channel state.

In FIG. 3, it is assumed that the secondary user scheduler 320 selects a single secondary user with respect to each of the K primary users and thereby selects a total of K secondary users. Therefore, in FIG. 3, data associated with each of the K secondary users is indicated as secondary data 1, secondary data 2, . . . , secondary data K.

However, there is no constraint that there be one secondary user for a corresponding primary user. That is, FIGS. 2 and 3 are only exemplary and at least one secondary user may be selected. Accordingly, where a secondary user is not required, a secondary user corresponding to a primary user may not exist. As an additional illustration, at least two primary users may correspond to a single secondary user.

Referring again to FIG. 2, the superposition coding unit 220 performs superposition coding for primary data associated with the at least one primary user and secondary data associated with the at least one secondary user to generate a transmission data stream. In FIG. 2, it is assumed that K primary data and K secondary data exist, and single secondary data corresponds to single primary data. Again, this is only for convenience of description. The K primary data and the K secondary data are provided to the superposition coding unit 220.

With the assumption that secondary data and primary data may be identified from the generated transmission data stream, the superposition coding unit 220 may perform superposition coding for the primary data and the secondary data according to various types of schemes and thereby generate the transmission data stream.

For example, a pulse position modulation scheme may be embodied as the superposition coding scheme. According to an aspect, the superposition coding unit 220 may perform superposition coding for the primary data and the secondary data by inserting at least one pulse in at least one frequency band among a plurality of frequency bands allocated for the primary data, based on the secondary data. According to another aspect, the superposition coding unit 220 may perform superposition coding for the primary data and the secondary data by inserting at least one pulse in at least one time slot among a plurality of time slots allocated for the primary data, based on the secondary data.

With the assumption that primary data 1 includes a plurality of subcarriers according to an orthogonal frequency division multiplexing (OFDM) scheme, the plurality of subcarriers may correspond to a plurality of frequency bands. The superposition coding unit 220 may select at least one frequency band from the plurality of frequency bands allocated for the primary data 1. The selected at least one frequency band is determined based on the secondary data 1. The superposition coding unit 220 may modify the primary data 1 by inserting a pulse in the selected at least one frequency band.

The modified primary data 1 is used as the transmission data stream and includes information associated with both the primary data 1 and the secondary data 1. Since the transmission data stream includes the pulse, the pulse included in the transmission data stream may be detected by a primary user and a secondary user. The primary user and the secondary user may identify the primary data 1 and the secondary data 1 from the transmission data stream based on a position of the frequency band or a position of the time slot where the pulse is detected.

Figure 4:
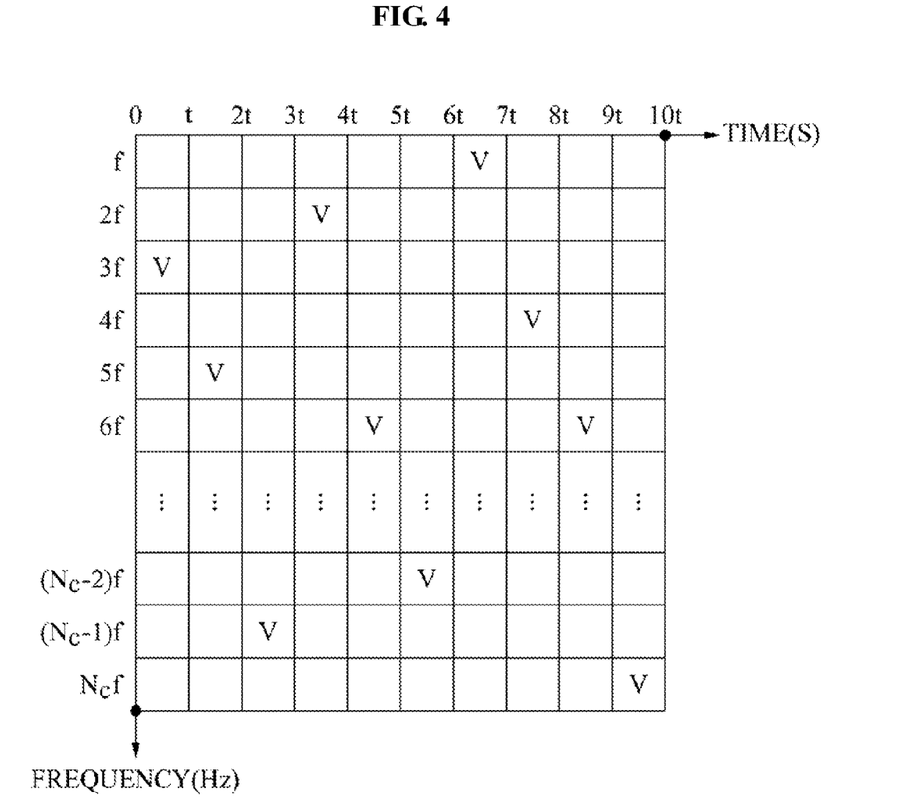
FIG. 4 is a diagram illustrating frequency-time grids of a transmission data stream generated by modifying primary data according to an exemplary embodiment.

FIG. 4 illustrates frequency-time grids of a transmission data stream generated by modifying primary data according to an exemplary embodiment.

As illustrated in FIG. 4, $N_c$ frequency bands corresponding to $N_c$ subcarriers and ten time slots are allocated for the primary data. Hereinafter, as an illustration only, it is assumed that $N_c$ is 512, a time length of a single time slot is t, and ten OFDM symbols exist in each time slot.

Referring to the time slots 0 through t, a pulse is inserted in a frequency band 3f among 512 frequency bands allocated for the primary data. In the case of inserting a single pulse in one frequency band among 512 frequency bands, the pulse may be inserted in any frequency band among 512 frequency bands. Therefore, 9 ($\log_2 512=9$) bits of information may be represented according to a position of the frequency band to be inserted with the single pulse.

As another example, here, it is assumed that a single pulse is inserted into each of three frequency bands among 512 frequency bands. In this case, $$C_3^{512} = \binom{512}{3}$$

combinations of three frequency bands where three pulses may be inserted respectively exist. Therefore, $$\log_2\binom{512}{3}$$

bits of information may be expressed by determining, from 512 frequency bands, three frequency bands to be inserted with three pulses respectively.

Generally, $$\log_2\binom{N_c}{k}$$

bits of information may be expressed by determining positions of k frequency bands, among Nc frequency bands, to be inserted with k pulses respectively. Therefore, a base station according to an aspect may select at least one frequency band from a plurality of frequency bands allocated for primary data, based on secondary data, and may insert at least one pulse in the selected at least one frequency band, thereby performing superposition coding for the primary data and the secondary data.

More specifically, for example, it is assumed that an interval between frequency bands is 10 kHz and Nc is about 500. In this case, an OFDM symbol duration may be $\frac{1}{10}$ kHz=0.1 ms. Where K=1, information associated with $\log_2 500 \cong 9$ bits of secondary data may be transmitted every 0.1 ms using the transmission data stream. In this case, a data rate of the secondary data information may be about 90 Kbps. The data rate of about 90 Kbps, depending upon the case, may be sufficient to support a service with a small data size. As another example, where K=5, the data rate may be about 450 Kbps of which a packet of 450 bits may be transmitted in 1 ms. The data rate of 450 Kbps may be sufficient to transmit a common packet in a small size.

According to an aspect, a data rate for a secondary user may be further improved by segmenting Nc frequency bands into L sections. Each of the L sections includes Nc/L frequency bands. Information of $$L \log_2 \binom{N_c/L}{k}$$

bits may be expressed by determining positions of k frequency bands, among Nc/L frequency bands, to be inserted with k pulses respectively.

Also, at least two secondary users may be allocated to a single beam by appropriately allocating the L sections to the at least two secondary users.

Through the same principle as described above, at least two primary users may be allocated to the single beam by segmenting Nc frequency bands into L sections.

Consequently, according to an aspect, it is possible to allocate at least one primary user and at least one secondary user to a single beam by considering channel states of users, a data size of services required by the users, a required data rate, a delay tolerance, and the like. It is understood that a secondary user may not be allocated.

A base station according to an aspect may perform superposition coding for primary data and secondary data by selecting at least one time slot from a plurality of time slots allocated for the primary data based on the secondary data and by inserting at least one pulse in the selected at least one time slot. That is, the base station may perform superposition coding for the primary data and the secondary data by adjusting a position of a frequency band and a position of a time slot where the pulse is inserted.

In certain embodiments described above, it is described that a "pulse" is inserted in the selected at least one frequency band or the selected at least one time slot. However, it is understood that this is only an example and thus, in addition to the "pulse," a "predetermined signal" identifiable by a primary user and a secondary user may be inserted in the selected at least one frequency band or the selected at least one time slot.

In FIG. 4, it is assumed that the communication system adopts an OFDM scheme. However, this is also only an illustration and not limited thereto.

Referring again to FIG. 2, the beamformer 230 performs beamforming for the generated transmission data streams based on the primary data and the secondary data. In particular, the beamformer 230 may perform beamforming for a transmission data stream 1 associated with both the primary data 1 and the secondary data 1 to thereby generate a single beam, and thus the beamformer 230 may simultaneously support the primary user 1 and the secondary user 1 using the single beam. As described above, the beamformer 230 may perform beamforming for the transmission data streams using a single beamforming vector extracted from a pre-stored codebook.

Figure 5:
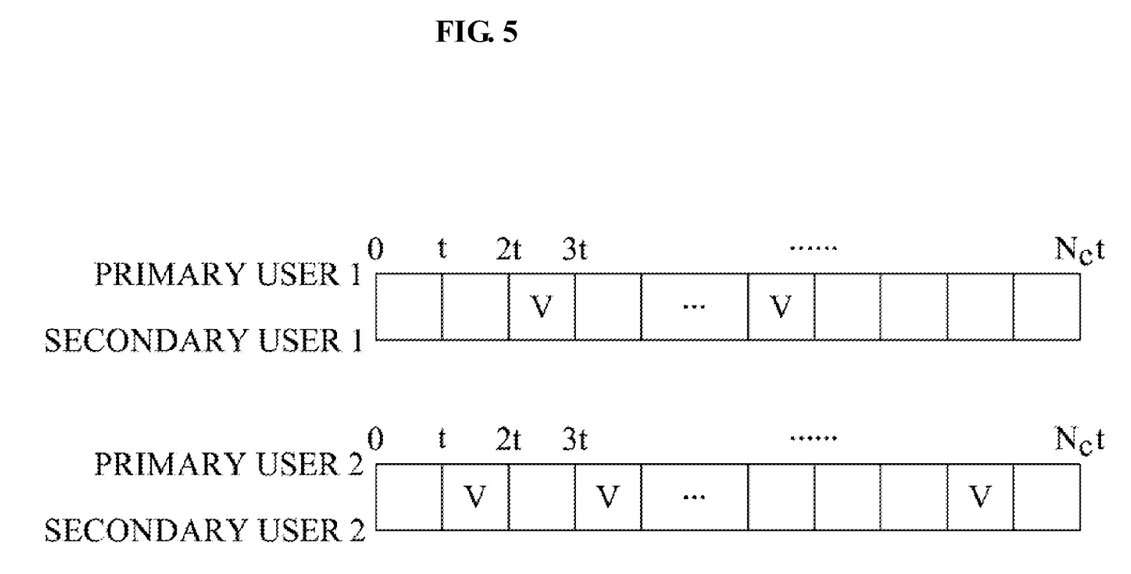
FIG. 5 is a diagram illustrating a transmission data stream 1 for a primary user 1 and a secondary user 1 and a transmission data stream 2 for a primary user 2 and a secondary user 2 according to an exemplary embodiment.

FIG. 5 illustrates a transmission data stream 1 for a primary user 1 and a secondary user 1, and a transmission data stream 2 for a primary user 2 and a secondary user 2 according to an exemplary embodiment.

Referring to FIG. 5, the transmission data stream 1 is generated by performing superposition coding for primary data 1 associated with the primary user 1 and secondary data 1 associated with the secondary user 1. Similarly, the transmission data stream 2 is generated by performing superposition coding for primary data 2 associated with the primary user 2 and secondary data 2 associated with the secondary user 2.

The transmission data stream 1 includes two pulses in two time slots among a plurality of time slots allocated for the primary data 1. The transmission data stream 2 includes three pulses in three time slots among a plurality of time slots allocated for the primary data 2. In this case, the primary user 1 may extract the primary data 1 from the transmission data stream 1. The secondary user 1 may extract the secondary data 1 from the transmission data stream 1 according to a position of each of the time slots with the inserted two pulses. Similarly, the primary user 2 and the secondary user 2 may identify the primary data 2 and the secondary data 2 from the transmission data stream 2.

Accordingly, a base station according to an aspect may perform superposition coding by determining a time slot to be inserted with a pulse, from which it will be apparent that teachings provided herein is not limited to/by OFDM system.

Figure 6:
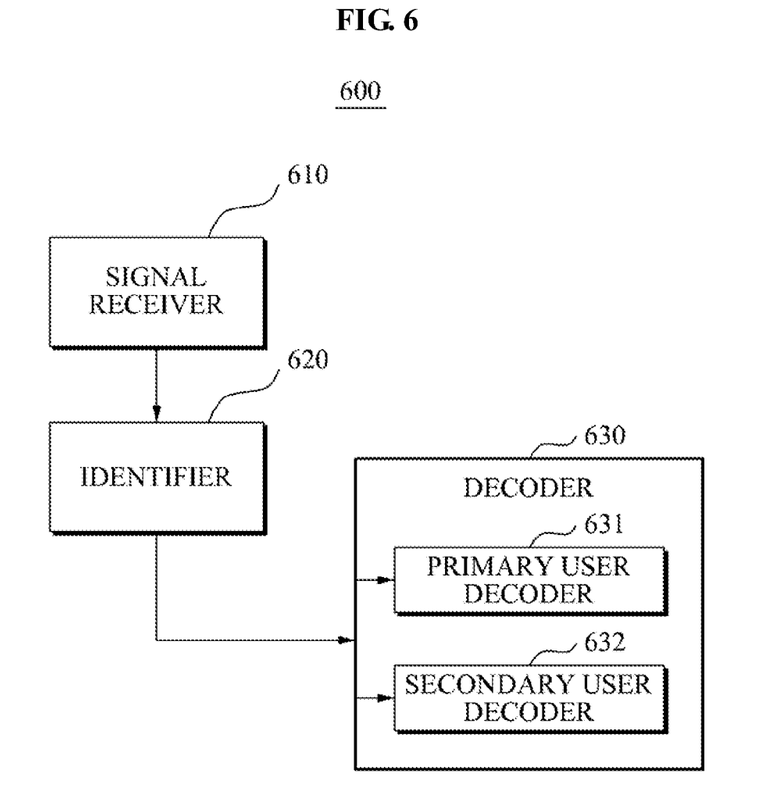
FIG. 6 is a block diagram illustrating a terminal according to an exemplary embodiment.

FIG. 6 illustrates a terminal 600 according to an exemplary embodiment. It is understood that a terminal may refer to a user described above.

As illustrated in FIG. 6, the terminal 600 comprises a signal receiver 610, an identifier 620, and a decoder 630.

The signal receiver 610 receives, from a base station, a transmission signal that is generated by beamforming a transmission data stream. The base station performs superposition coding for primary data associated with a primary user and secondary data associated with at least one secondary user corresponding to the primary user and thereby generating the transmission data stream.

The identifier 620 identifies one of the primary data and the secondary data from the transmission signal. According to an aspect, the identifier 620 may identify the primary data and the secondary data from the transmission data stream according to a characteristic of a predetermined coding scheme.

According to an aspect, it is assumed that the base station generates the transmission data stream by modifying the primary data in at least one frequency band or at least one time slot, among a plurality of frequency bands or a plurality of time slots allocated for the primary data, based on the secondary data. In this case, the identifier 620 may identify the primary data and the secondary data from the transmission data stream according to a position of the at least one frequency band or a position of the at least one time slot.

According to an aspect, the base station may generate the transmission data stream according to a pulse position modulation scheme. The identifier 620 may identify the primary data and the secondary data from the transmission data stream based on a position of at least one pulse included in the transmission data stream. For example, the identifier 620 may identify the primary data and the secondary data from the transmission data stream based on a position of a frequency band or a position of a time slot where a signal with a strength greater than or equal to a predetermined threshold is detected. This is because the strength of the signal detected by the identifier may be relatively large in the frequency band or the time slot where the pulse is inserted.

The decoder 630 decodes the one of the primary data and the secondary data. A primary user decoder 631 may decode the primary data and a secondary user decoder 630 may decode the secondary data.

Figure 7:
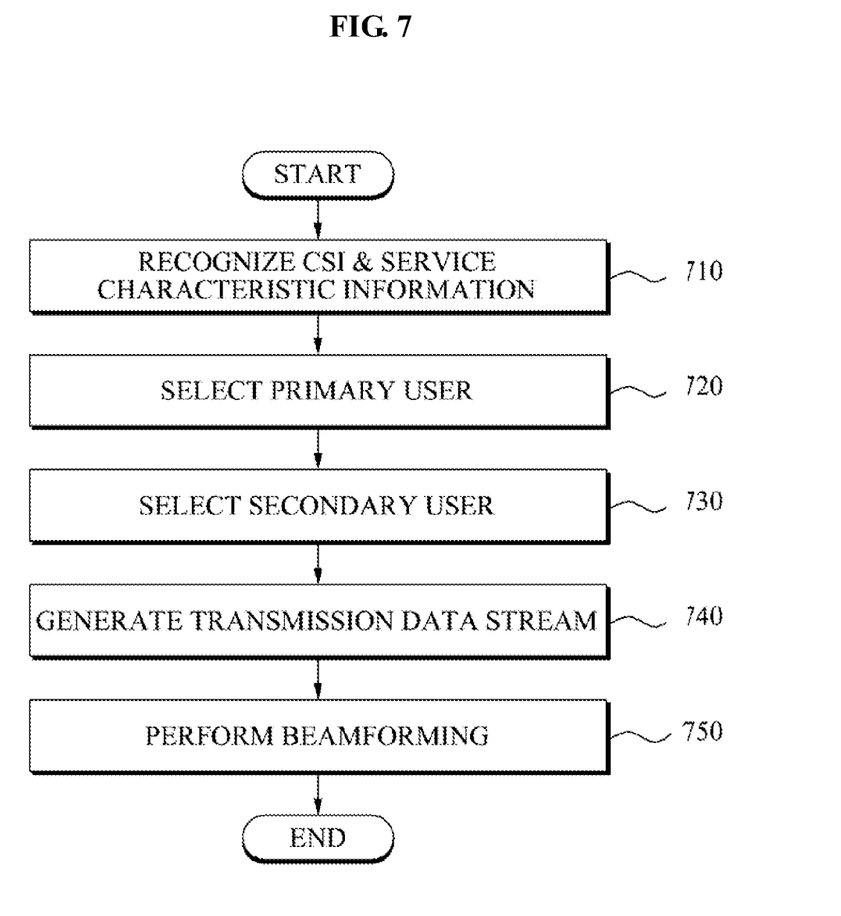
FIG. 7 is a flowchart illustrating a method of transmitting a signal according to an exemplary embodiment.

FIG. 7 illustrates a signal transmission method according to an exemplary embodiment.

As illustrated in FIG. 7, the signal transmission method comprises recognizing CSI of users and service characteristic information in operation 710.

The signal transmission method further comprises selecting at least one primary user from the users based on the CSI and/or the channel characteristic information in operation 720.

The signal transmission method further comprises selecting, from the users, at least one secondary user corresponding to each of the at least one primary user, based on the CSI and/or the channel characteristic information, in operation 730.

The signal transmission method further comprises performing superposition coding for primary data associated with the at least one primary user and secondary data associated with the at least one secondary user to thereby generate a transmission data stream in operation 740.

The signal transmission method further comprises performing beamforming for the transmission data stream in operation 750.

Figure 8:
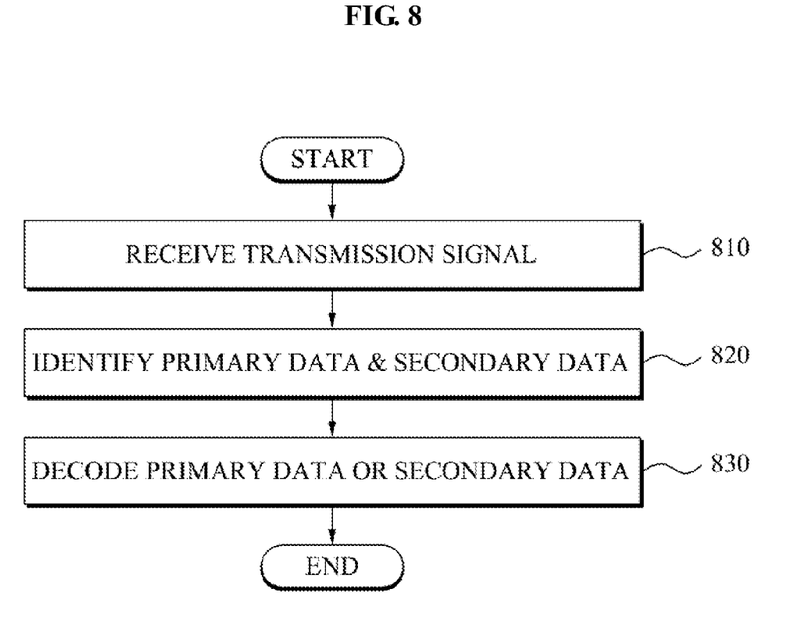
FIG. 8 is a flowchart illustrating a method of receiving a signal according to an exemplary embodiment.

FIG. 8 illustrates a signal reception method according to an exemplary embodiment.

As illustrated in FIG. 8, the signal reception method comprises receiving a transmission signal from a base station in operation 810. The transmission signal may be generated by beamforming a transmission data stream. A base station may perform superposition coding for primary data associated with a primary user and secondary data associated with at least one secondary user corresponding to the primary user and thereby generating the transmission data stream.

The signal reception method further comprises identifying one of the primary data and the secondary data from the transmission data stream according to a characteristic of a predetermined coding scheme in operation 820.

The signal reception method further comprises decoding the one of the primary data and the secondary data in operation 830.

Operations of FIGS. 7 and 8 may be further understood with reference to FIGS. 1 through 6 and the corresponding descriptions thereof. Accordingly, additional descriptions will be omitted herein.

The methods described above including a signal transmission method and a signal reception method, may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods decoded above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station comprising:
a scheduler configured to group at least one primary user and at least one secondary user corresponding to each of the at least one primary and secondary user according to characteristics of services desired by the users;
a superposition coding unit configured to perform superposition coding for primary data associated with the at least one primary user and secondary data associated with the at least one secondary user to generate a transmission data stream; and
a beamformer configured to perform beamforming for the transmission data stream,
wherein at least one of a frequency band or at least one of a time slot is selected from among a plurality of frequency bands or a plurality of time slots allocated for the primary data, the primary data is modified to include a predetermined signal in the selected at least one frequency band or at least one time slot so as to identify the primary and the secondary data.

2. The base station of claim 1, wherein the scheduler is configured to group the at least one primary user and the at least one secondary user based on channel state information of channels that are formed between the users and the base station.

3. The base station of claim 1, wherein the scheduler is configured to calculate achievable sum data rates based on channel state information of channels formed between the users and the base station, and selects the at least one primary user based on the calculated sum data rates.

4. The base station of claim 1, wherein the scheduler is configured to select the at least one primary user based on orthogonality of channels formed between the users and the base station using channel state information of the channels.

5. The base station of claim 1, wherein the superposition coding unit is configured to perform superposition coding so as to identify the primary data and the secondary data from the transmission data stream.

6. The base station of claim 1, wherein the superposition coding unit is configured to modify the primary data according to a pulse position modulation scheme, based on the secondary data, to generate the transmission data stream.

7. The base station of claim 1, wherein the superposition coding unit is configured to modify the primary data in at least one frequency band among a plurality of frequency bands allocated for the primary data based on the secondary data, to generate the transmission data stream.

8. The base station of claim 1, wherein the superposition coding unit is configured to select at least one frequency band from a plurality of frequency bands allocated for the primary data and is configured to modify the primary data to include a predetermined signal in the selected at least one frequency band, so as to identify the primary data and the secondary data from the transmission data stream.

9. The base station of claim 8, wherein the predetermined signal is a pulse signal.

10. The base station of claim 1, wherein the superposition coding unit is configured to modify the primary data in at least one time slot among a plurality of time slots allocated for the primary data based on the secondary data, to generate the transmission data stream.

11. The base station of claim 1, wherein the superposition coding unit is configured to select at least one time slot from a plurality of time slots allocated for the primary data and is configured to modify the primary data to include a predetermined signal in the selected at least one time slot, so as to identify the primary data and the secondary data from the transmission data stream.

12. The base station of claim 1, wherein the size of the primary data is greater than the size of the secondary data, or a delay tolerance of a service required by the secondary user is strictly limited in comparison to a delay tolerance of a service required by the primary user.

13. The base station of claim 1, wherein the beamformer is configured to perform beamforming for the transmission data stream to generate a single beam for the at least one primary user and the at least one secondary user.

14. The base station of claim 13, wherein the scheduler is configured to divide a frequency band to schedule at least two primary users with respect to the single beam.

15. The base station of claim 1, wherein the primary data is encoded according to an additive white Gaussian noise (AWGN) channel code and the primary data is modulated according to a predetermined modulation scheme.

16. The base station of claim 1, wherein the secondary user is a user requiring a small data size, low data rate, and a strict delay tolerance and the primary user is a user requiring a large data size, high data rate, and a non-strict delay tolerance.

17. The base station of claim 1, wherein the base station selects a user as the primary user, the base station retrieves another user with a channel direction similar or closest to a channel direction of the primary user based on channel state information (CSI) and the base station determines the other user as the secondary user based on the primary user.

18. The base station of claim 1, wherein the scheduler groups the at least one primary user and the at least one secondary user based on at least one of a data size, a data rate, and a delay tolerance of the services required by the users.

19. A terminal configured to receive a transmission signal, from a base station, which is generated by beamforming a transmission data stream in which primary data associated with a primary user and secondary data associated with at least one secondary user corresponding to the primary user are provided based on characteristics of services desired by the users, the terminal comprising:
  a signal receiver configured to receive the transmission signal;
  an identifier configured to identify one of the primary data and the secondary data from the transmission signal according to a characteristic of a predetermined coding scheme; and
  a decoder configured to decode the one of the primary data and the secondary data,
  wherein at least one of a frequency band or at least one of a time slot is selected from a plurality of frequency bands or a plurality of time slots allocated for the primary data, the primary data is modified to include a predetermined signal in the selected at least one frequency band or at least one time slot, and the primary and the secondary data are identified.

20. The terminal of claim 19, wherein:
  the transmission data stream is a data stream in which the primary data and the secondary data are superposition coded, and having the primary data in which at least one frequency band or at least one time slot, among the plurality of frequency bands or the plurality of time slots allocated for the primary data, is modified based on the secondary data, and
  the identifier identifies the one of the primary data and the secondary data from the transmission data stream according to a position of at least one frequency band or a position of at least one time slot.

21. The terminal of claim 19, wherein:
  the transmission data stream is a data stream generated according to a pulse position modulation scheme, and
  the identifier identifies the primary data and the secondary data from the transmission data stream based on a position of at least one pulse included in the transmission data stream.

22. The terminal of claim 21, wherein the position of the at least one pulse included in the transmission data stream is associated with at least one time slot or at least one frequency band where the at least one pulse exists.

23. The terminal of claim 19, wherein the transmission data stream is a data stream having the primary data and the secondary data associated with the primary user and the at least one secondary user that are grouped based on characteristics of services desired by users and/or channel state information of channels formed between the users and the base station.

24. A method of transmitting a signal, the method comprising:
  grouping at least one primary user and at least one secondary user corresponding to each of the at least one primary and secondary user according to characteristics of services desired by the users;
  performing superposition coding for primary data associated with the at least one primary user and secondary data associated with the at least one secondary user to generate a transmission data stream; and
  performing beamforming for the transmission data stream wherein at least one of a frequency band or at least one of a time slot is selected from among a plurality of frequency bands or a plurality of time slots allocated for the primary data, the primary data is modified to include a predetermined signal in the selected at least one frequency band or at least one time slot so as to identify the primary and the secondary data.

25. A method of receiving a signal, the method comprising:
  receiving, from a base station, a transmission signal that is generated by beamforming a transmission data stream in which primary data associated with a primary user and secondary data associated with at least one secondary user corresponding to the primary user are provided based on characteristics of services desired by the users;
  identifying one of the primary data and the secondary data from the transmission signal according to a characteristic of a predetermined coding scheme; and
  decoding the one of the primary data and the secondary data,
  wherein at least one of a frequency band or at least one of a time slot is selected from a plurality of frequency bands or a plurality of time slots allocated for the primary data, the primary data is modified to include a predetermined signal in the selected at least one frequency band or at least one time slot, and the primary and the secondary data are identified.

26. A terminal configured to receive a transmission signal corresponding to a transmission data stream having primary data for a primary user and secondary data for a secondary user corresponding to the primary user, the primary and secondary users grouped among users based on characteristics of services desired by the users and/or channel state information of the users, the services desired by the users are selected based on at least one of a data size, a data rate, and a delay tolerance the terminal comprising:
- a signal receiver configured to receive the transmission signal;
- an identifier configured to identify one of the primary data and the secondary data from the transmission signal; and
- a decoder configured to decode the one of the primary data and the secondary data,
- wherein at least one of a frequency band or at least one of a time slot is selected from a plurality of frequency bands or a plurality of time slots allocated for the primary data, the primary data is modified to include a predetermined signal in the selected at least one frequency band or at least one time slot, and the primary and the secondary data are identified.

27. The terminal of claim 26, wherein transmission signal corresponds to one of:
- the transmission data stream having the primary data and the secondary data in which the primary user is selected among the users to achieve a predetermined sum data rate, and the secondary user is selected among non-primary users of the users based on the channel state information, and
- the transmission data stream having the primary data and the secondary data in which the primary user and the secondary user are selected based on at least one of a data size, a data rate, and a delay tolerance of the services required by the users.

* * * * *